United States Patent
Wang et al.

(10) Patent No.: US 10,735,255 B2
(45) Date of Patent: *Aug. 4, 2020

(54) METHOD, APPARATUS, AND SYSTEM FOR CONTROLLING SELF-OPTIMIZATION SWITCH

(71) Applicant: Huawei Technologies Co., Ltd., Shenzhen (CN)

(72) Inventors: Wei Wang, Shenzhen (CN); Lan Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,234

(22) Filed: Apr. 26, 2019

(65) Prior Publication Data

US 2019/0253312 A1 Aug. 15, 2019

Related U.S. Application Data

(63) Continuation of application No. 13/237,134, filed on Sep. 20, 2011, now Pat. No. 10,305,727, which is a
(Continued)

(51) Int. Cl.
*H04L 12/24* (2006.01)

(52) U.S. Cl.
CPC .......... *H04L 41/0803* (2013.01); *H04L 41/00* (2013.01); *H04L 41/0823* (2013.01)

(58) Field of Classification Search
CPC . H04L 41/0803; H04L 41/00; H04L 41/0823; H04L 12/24; H04W 88/02
(Continued)

(56) References Cited

U.S. PATENT DOCUMENTS 6,614,781 B1 9/2003 Elliott et al.
6,829,491 B1 12/2004 Yea et al.
(Continued)

FOREIGN PATENT DOCUMENTS

CN 1913706 A 2/2007
CN 101047965 A 10/2007
(Continued)

OTHER PUBLICATIONS

Self-Organizing Networks (SON) in 3GPP Long Term Evolution, Author: Sujuan Feng, Publisher: Nomor Research GmbH, Munich, Date: May 20, 2008 (hereinafter as,NPL1) (Year: 2008).*
(Continued)

*Primary Examiner* — Tonia L Dollinger
*Assistant Examiner* — Mehulkumar J Shah
(74) *Attorney, Agent, or Firm* — Leydig, Voit & Mayer, Ltd.

(57) ABSTRACT

Embodiments of the present disclosure provide a method, an apparatus, and a system for controlling a self-optimization switch. By using technical solutions provided in embodiments of the present disclosure, enabling and disabling of self-optimization can be controlled, and a state of the self-optimization switch can be obtained. A technical solution provided in embodiments of the present disclosure is as follows: a method for controlling a self-optimization switch includes: obtaining a target state of a self-optimization switch; and sending a setting command that includes the target state to a managed unit, where the setting command instructs the managed unit to change the state of the self-optimization switch to the target state.

16 Claims, 4 Drawing Sheets

Related U.S. Application Data continuation of application No. PCT/CN2009/070935, filed on Mar. 20, 2009.

(58) Field of Classification Search
USPC .................. 709/221, 220; 455/418; 712/15; 713/100
See application file for complete search history.

(56) References Cited

U.S. PATENT DOCUMENTS

| | | | |
|---|---|---|---|
| 2006/0031454 | A1 | 2/2006 | Ewing et al. |
| 2007/0014257 | A1 | 1/2007 | Strong |
| 2007/0285079 | A1 | 12/2007 | Nasle |
| 2010/0064128 | A1 | 3/2010 | Mendelow et al. |
| 2011/0096687 | A1* | 4/2011 | Dottling ............... H04W 24/02 370/252 |
| 2011/0280157 | A1* | 11/2011 | Suerbaum ........... H04L 41/0663 370/255 |
| 2011/0319110 | A1 | 12/2011 | Futaki et al. |
| 2012/0009972 | A1 | 1/2012 | Viering et al. |
| 2012/0066377 | A1* | 3/2012 | Li ........................... H04L 41/00 709/224 |
| 2019/0253312 | A1* | 8/2019 | Wang ...................... H04L 41/00 |

FOREIGN PATENT DOCUMENTS

| | | |
|---|---|---|
| CN | 101159607 A | 4/2008 |
| CN | 101223724 A | 7/2008 |
| CN | 101321101 A | 12/2008 |
| CN | 101389125 A | 3/2009 |
| EP | 2173123 B1 | 4/2015 |
| WO | 2008003033 A2 | 1/2008 |
| WO | 2008042414 A2 | 4/2008 |

OTHER PUBLICATIONS

ETSI TS 1320500 v8.0.0, Author: ETSI ( hereinafter as "NPL") (Year: 2009).*

ETSI TS 1320500 v8.0.0, ETSI, Author: European Telecommunications Standard Institute (Year: 2009).*

Self-Organizing Networks (SON) in 3GPP Long Term Evolution, Author: Sujuan et al. (Year: 2008).*

U.S. Appl. No. 13/237,134, filed Sep. 20, 2011.

Feng "Self Organizing Networks (SON) in 3GPP Long Term Evolution," Nomor Research GmbH, Munich (May 20, 2008).

Comer, "Internetworking ith TCP/IP," Prentice Hall, pp. 553-574 (Jan. 1, 2000).

Feng et al., "Self-Organizing Netwroks (SON) in 3GPP Long Term Evolution," Nomor Research GmbH, XP-002672650 (May 20, 2008).

Schmelz et al., "Framework for the development of self-organisation methods," D2.4, INFSO-ICT-216284 Socrates (2008).

"Digital Cellular Telecommunications System (Phase 2+); Universal Mobile Telecommunications System (UMTS); Telecommunication Management; Integration Reference Point (IRP) Concept and Definitions," 3GPP TS 32.150, version 7.3.0 Release 7, ETSI TS 132 150, V7.3.0, 31 pages (Apr. 2008).

Case J., et al. "A Simple Network Management Protocol (SNMP)," retrieved from the internet at <http://www.faqs.org/rfcs/rfc1157.htm>, on Mar. 23, 2001, RFC1157, 24 pages (May 1990).

Written Opinion of the International Searching Authority issued in corresponding PCT Patent Application No. PCT/CN2009/070935, dated Dec. 31, 2009.

International Search Report issued in corresponding PCT Patent Application No. PCT/CN2009/70935, dated Dec. 31, 2009.

Office Action issued in corresponding European Patent Application No. 09841727.2, dated Apr. 16, 2012.

Search Report issued in corresponding Chinese Patent Application No. 2009801235675, dated Sep. 17, 2012.

Office Action issued in corresponding Chinese Patent Application No. 200980123567.5, dated Sep. 25, 2012.

Lars et al ."Framework for the development of self-organisation methods," INFSO-ICT-216284, Socrates D2 .4, Seventh Framework Programme (2008).

"3rd Generation Partnership Project; Technical Specification Group Services and System Aspects; Telecommunication Management; Self-Organizing Networks (SON); Concepts and requirements(Release 8)," 3GPP TS 32.500 V8.0.0, pp. 1-13, 3rd Generation Partnership Project, Valbonne, France (Dec. 2008).

"3rd Generation Partnership Project; Technical Specification Group Services and System Aspects; Telecommunication management; Configuration Management (CM); Kernel CM Information Service (IS) (Release 8)," 3GPP TS 32.662 V8.1.0, pp. 1-22, 3rd Generation Partnership Project, Valbonne, France (Mar. 2009).

\* cited by examiner

METHOD, APPARATUS, AND SYSTEM FOR CONTROLLING SELF-OPTIMIZATION SWITCH

CROSS-REFERENCE TO RELATED APPLICATIONS

This application is a continuation of U.S. patent application Ser. No. 13/237,134, filed on Sep. 20, 2011, which is a continuation of International Application No. PCT/CN2009/070935, filed on Mar. 20, 2009. All of the afore-mentioned patent applications are hereby incorporated by reference in their entireties.

TECHNICAL FIELD

The present disclosure relates to the communications field, and in particular, to a method, an apparatus, and a system for controlling a self-optimization switch.

BACKGROUND

In an LTE (Long Term Evolution) system, a SON (Self Organizing Network) technology is used. The SON technology integrates expert's experience and an intelligent technology into an automatic program, and enables the network to automatically collect data, analyze and discover a problem, and perform adjustment. Self-optimization is an instance of the SON.

In some cases, the self-optimization of the SON is expected to automatically run, automatically optimize network parameters and performance, and so on; and it is expected that a state of the self-optimization can be known at any time, so that complete self-optimization management can be implemented. In other cases (for example, in the case of network-wide commissioning and test or when the network runs stably), however, the current state of the network is expected to be maintained, and the self-optimization of the network is not expected to be enabled. Even in some special cases (for example, commissioning of some functions of the network), only some of the self-optimization functions of the network are expected to be disabled without affecting running of other self-optimization processes. Therefore, to satisfy these actual scenario requirements, the LTE needs to be able to not only provide self-optimization of the network but also control enabling and disabling of each optimization function.

A 3rd Generation Partnership Project (3GPP) network management system introduces a concept of an integration reference point (IRP). An information model of an interface defined by the IRP includes a managed object, a network resource model (NRM), and information exchange semantics. The managed object of the NRM refers to all physical networks and logical networks owned by an operator and nodes (for example, physical devices in an equipment room) connected to those networks. A standard Interface-N is available between an integration reference point manager (IRPManager) and an integration reference point agent (IRPAgent).

Currently, the 3GPP already defines the following IRPs: an Alarm IRP, a Basic CM (basic configuration management) IRP, a Bulk CM (bulk data configuration management) IRP, a Performance Management IRP, a Generic Network Resource IRP, a Notification IRP, and an Inventory IRP. These IRPs already satisfy most interface requirements and service requirements.

However, in the self-optimization management of the SON, the existing IRPs cannot satisfy the requirements for controlling the enabling and disabling of a self-optimization process, and a state of the self-optimization process cannot be known at any time.

SUMMARY

Embodiments of the present disclosure provide a method, an apparatus, and a system for controlling a self-optimization switch to control enabling and disabling of a self-optimization process and know a state of the self-optimization switch.

To achieve the foregoing objective, embodiments of the disclosure adopts the following technical solutions:

A method for controlling a self-optimization switch includes: obtaining a target state of a self-optimization switch; and sending a setting command that includes the target state to a managed unit, where the setting command instructs the managed unit to change a state of the self-optimization switch to the target state.

A method for controlling a self-optimization switch includes: receiving a setting command that is sent by a managing unit and includes a target state of a self-optimization switch; and changing a state of the self-optimization switch to the target state according to the setting command.

An apparatus for controlling a self-optimization switch includes: an obtaining module, configured to obtain a target state of a self-optimization switch; and a processing module, configured to send a setting command that includes the target state to a managed unit, where the setting command instructs the managed unit to change a state of the self-optimization switch to the target state.

An apparatus for controlling a self-optimization switch includes: a setting command receiving module, configured to receive a setting command that is sent by a managing unit and includes a target state of a self-optimization switch; and a processing module, configured to change a state of the self-optimization switch to the target state according to the setting command.

A system for controlling a self-optimization switch includes: a managing unit, configured to obtain a target state of a self-optimization switch, and send a setting command that includes the target state to a managed unit; and the managed unit, configured to receive the setting command that is sent by the managing unit and includes the target state of the self-optimization switch, and change a state of the self-optimization switch to the target state according to the setting command.

A method for controlling a self-optimization switch includes: sending a query command to a managed unit, where the query command is an instruction for obtaining a current state of a self-optimization switch; and receiving the current state of the self-optimization switch returned from the managed unit.

A method for controlling a self-optimization switch includes: receiving a query command sent by a managing unit; obtaining a current state of a self-optimization switch according to the query command; and returning the current state of the self-optimization switch to the managing unit.

An apparatus for controlling a self-optimization switch includes: a sending module, configured to send a query command to a managed unit, where the query command is an instruction for obtaining a current state of a self-optimization switch; and a receiving module, configured to receive the current state of the self-optimization switch returned from the managed unit.

An apparatus for controlling a self-optimization switch includes: a query command receiving module, configured to receive a query command sent by a managing unit; a querying module, configured to obtain a current state of a self-optimization switch according to the query command; and a sending module, configured to return the current state of the self-optimization switch to the managing unit.

A system for controlling a self-optimization switch includes: a managing unit, configured to send a query command to a managed unit, where the query command is an instruction for obtaining a current state of a self-optimization switch, and receive the current state of the self-optimization switch returned from the managed unit; and the managed unit, configured to receive the query command sent by the managing unit, obtain the current state of the self-optimization switch according to the query command, and return the current state of the self-optimization switch to the managing unit.

Embodiments of the present disclosure provide a method, an apparatus, and a system for controlling a self-optimization switch. In embodiments of the present disclosure, a desired target state of the self-optimization switch is known firstly, and then the state of the self-optimization is changed so that the state of the self-optimization switch is the same as the target state. In addition, the current state of the self-optimization switch may be obtained through a query command. By using the technical solutions provided in embodiments of the present disclosure, the state of the self-optimization switch can be controlled. Thereby, enabling or disabling of the self-optimization is controlled, and the state of the self-optimization switch can be known at any time, which satisfies a self-optimization management requirement.

DETAILED DESCRIPTION

Currently, self-optimization fields of the 3GPP include Handover, Load Balancing, Interference Control, Capacity & Coverage, RACH Optimization (random access channel optimization), and Energy Saving.

To control a self-optimization switch in these self-optimization fields, embodiments of the present disclosure configure a self-optimization switch attribute in each field. The mapping relationship is shown in Table 1.

TABLE 1

| Type of the Self-Optimization Switch | Value of the Self-Optimization Switch Attribute |
| --- | --- |
| Handover (HO) self-optimization | True/False (True/False) |
| Load Balancing (LB) self-optimization | True/False |
| Inter-Cell Interference Coordination (ICIC) self-optimization | True/False |
| Capacity and Coverage (CC) self-optimization | True/False |
| RACH self-optimization | True/False |
| Energy Saving (ES) self-optimization | True/False |

A value of the self-optimization switch attribute in each field may be a Boolean parameter. When the value of the self-optimization switch attribute is True, the self-optimization switch is turned on in this field; otherwise the self-optimization switch is turned off in this field.

In the embodiments of the present disclosure, these parameters are used to control the self-optimization switch so as to control enabling and disabling of self-optimization.

In the embodiments of the present disclosure, a managed unit may be an Element Management System (EMS) or a network device that includes an integration reference point agent; the managed unit may also be a network device managed by a network management system through an EMS. A managing unit may be an network management system that includes an integration reference point manager.

The following describes the method, apparatus, and system for controlling a self-optimization switch in detail with reference to the accompanying drawings.

Embodiment 1

Figure 1:
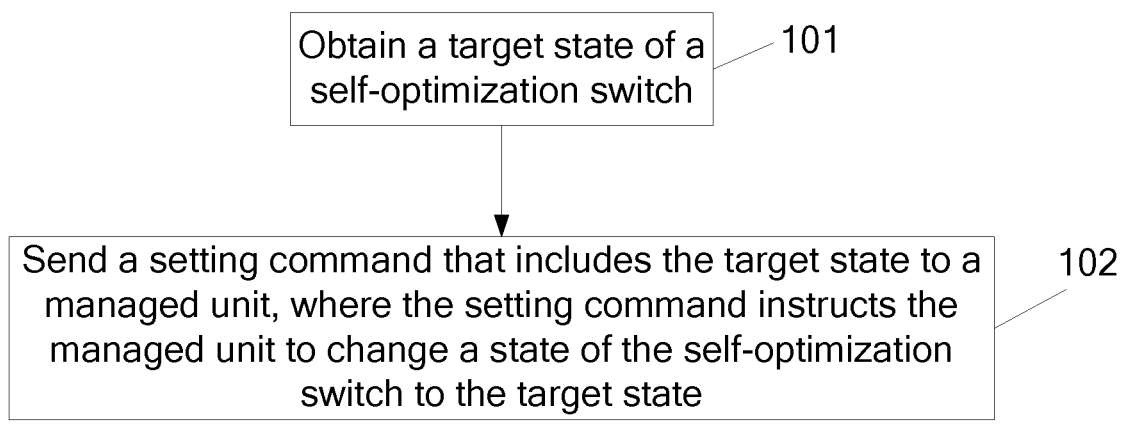
FIG. 1 is a flowchart of a method for controlling a self-optimization switch according to a first embodiment of the present disclosure.

This embodiment of the present disclosure provides a method for controlling a self-optimization switch. As shown in FIG. 1, the method includes:

101. Obtain a target state of the self-optimization switch, for example, by receiving an instruction that is input by a user and indicates the target state of the self-optimization switch.

The instruction input by the user indicates a user-expected state of the self-optimization switch. For example, if the user expects that self-optimization of a network can be disabled, the target state of the self-optimization switch in the instruction is off.

102. Send a setting command that includes the target state to a managed unit, where the setting command instructs the managed unit to change a state of the self-optimization switch to the target state.

After the setting command that includes the target state of the self-optimization switch is sent to the managed unit, a setting result returned from the managed unit is received.

Figure 2:
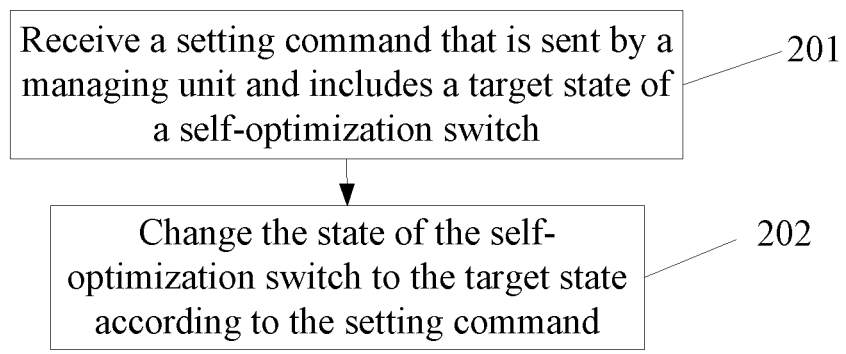
FIG. 2 is a flowchart of a method for controlling a self-optimization switch according to the first embodiment of the present disclosure.

This embodiment of the present disclosure provides a method for controlling a self-optimization switch. As shown in FIG. 2, the method includes:

201. Receive a setting command that is sent by a managing unit and includes a target state of the self-optimization switch.

202. Change a state of the self-optimization switch to the target state according to the setting command.

If the target state of the self-optimization switch is off, the self-optimization switch is turned off; if the target state of the self-optimization switch is on, the self-optimization switch is turned on. After the state of the self-optimization switch is changed to the target state, a setting result is returned to the managing unit. If the state of the self-optimization switch is successfully changed to the target state, True is returned to the managing unit; if the state of the self-optimization switch fails to be changed to the target state, False is returned to the managing unit.

This embodiment of the present disclosure provides a method for controlling a self-optimization switch. In this embodiment of the present disclosure, a user-desired target state of the self-optimization switch is known firstly, and then the state of the self-optimization switch is changed so that the state of the self-optimization switch is the same as the target state. By using the technical solution provided in this embodiment of the present disclosure, the state of the self-optimization switch can be controlled and thereby enabling or disabling of the self-optimization is controlled, which satisfies a self-optimization management requirement.

Embodiment 2

Figure 3:
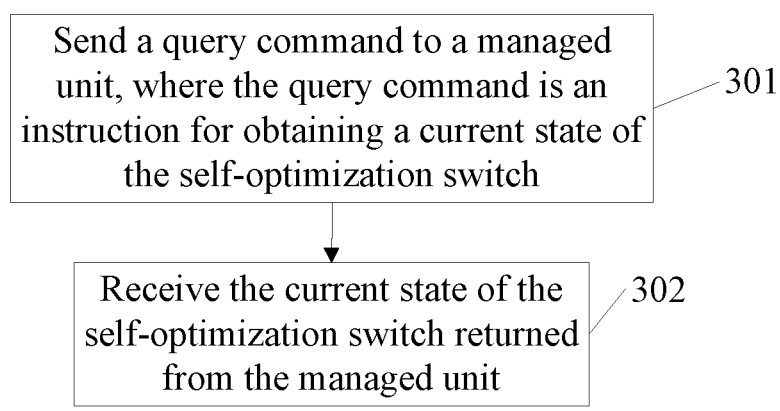
FIG. 3 is a flowchart of a method for controlling a self-optimization switch according to a second embodiment of the present disclosure.

This embodiment of the present disclosure provides a method for controlling a self-optimization switch. As shown in FIG. 3, the method includes:

301. Send a query command to a managed unit, where the query command is an instruction for obtaining a current state of the self-optimization switch.

302. Receive the current state of the self-optimization switch returned from the managed unit.

Figure 4:
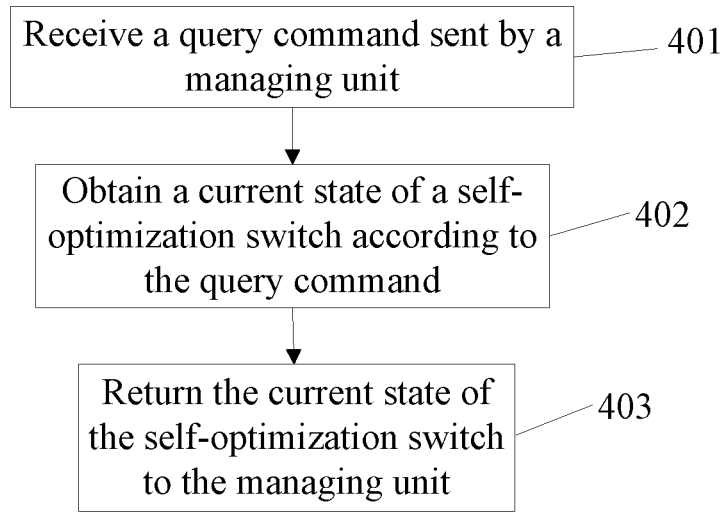
FIG. 4 is a flowchart of a method for controlling a self-optimization switch according to the second embodiment of the present disclosure.

This embodiment of the present disclosure provides a method for controlling a self-optimization switch. As shown in FIG. 4, the method includes:

401. Receive a query command sent by a managing unit.

402. Obtain a current state of the self-optimization switch according to the query command.

403. Return the current state of the self-optimization switch to the managing unit.

This embodiment of the present disclosure provides a method for controlling a self-optimization switch. In this embodiment of the present disclosure, the current state of the self-optimization switch is obtained through a query command. By using the technical solution provided in this embodiment of the present disclosure, the current state of the self-optimization switch can be known at any time, which satisfies a self-optimization management requirement.

Embodiment 3

Before a managing unit sends a setting command to a managed unit, the managing unit may also query the managed unit for a state of a self-optimization switch; if a state of the self-optimization switch is the same as a user-desired state, the managing unit may not send the setting command to the managed unit.

This embodiment of the present disclosure provides a method for controlling a self-optimization switch. The method includes:

1. Obtain a target state of the self-optimization switch, for example, by receiving an instruction that is input by a user and indicates the target state of the self-optimization switch.

The instruction input by the user indicates a user-expected state of the self-optimization switch. For example, if the user expects that self-optimization of a network can be disabled, the target state of the self-optimization switch in the instruction is off.

2. Obtain a current state of the self-optimization switch.

In this embodiment, the method for obtaining the current state of the self-optimization switch may include but is not limited to: sending a query command to a managed unit, where the query command is an instruction for obtaining the current state of the self-optimization switch; and receiving the current state of the self-optimization switch returned from the managed unit.

3. If the current state is different from the user-desired state, send a setting command that includes the target state to the managed unit, where the setting command instructs the managed unit to change the state of the self-optimization switch to the target state.

If the target state of the self-optimization switch is off and the current state of the self-optimization switch is on, a setting command that includes information indicating that the target state of the self-optimization switch is off is sent to the managed unit, where the setting command instructs the managed unit to turn off the self-optimization switch. If the target state of the self-optimization switch is on and the current state of the self-optimization switch is off, a setting command that includes information indicating that the target state of the self-optimization switch is on is sent to the managed unit, where the setting command instructs the managed unit to turn on the self-optimization switch.

If the current state of the self-optimization switch is the same as the target state, a setting command that includes the target state of the self-optimization switch does not need to be sent to the managed unit.

After the setting command that includes the target state of the self-optimization switch is sent to the managed unit, a setting result returned from the managed unit is received.

This embodiment of the present disclosure provides a method for controlling a self-optimization switch. The method includes:

1. Receive a setting command that is sent by a managing unit and includes a target state of the self-optimization switch.

Before the setting command is received, a query command sent by the managing unit is also received, and a current state of the self-optimization switch is obtained according to the query command. Then, the current state of the self-optimization switch is retuned to the managing unit.

2. Change the state of the self-optimization switch to the target state according to the setting command.

If the target state of the self-optimization switch is off, the self-optimization switch is turned off; if the target state of the self-optimization switch is on, the self-optimization switch is turned on. After the state of the self-optimization switch is changed to the target state, a setting result is returned to the managing unit. If the state of the self-optimization switch is successfully changed to the target state, True is returned to the managing unit; if the state of the self-optimization switch fails to be changed to the target state, False is returned to the managing unit.

This embodiment of the present disclosure provides a method, an apparatus, and a system for controlling a self-optimization switch. In this embodiment of the present disclosure, the current state of the self-optimization switch is obtained firstly, and then the current state of the self-optimization switch is compared with the target state input by the user; if the current state of the self-optimization switch fails to meet the user's requirement, the state of the self-optimization switch is changed so that the state of the self-optimization switch is the same as the target state. By using the technical solution provided in this embodiment of the present disclosure, the state of the self-optimization switch can be known and controlled, and thereby enabling or disabling of the self-optimization is controlled, which satisfies a self-optimization management requirement.

Embodiment 4

In this embodiment of the present disclosure, a self-optimization IRP is added in a 3GPP Interface-N, and a related operation on the IRP is defined to control a self-optimization switch.

Figure 5:
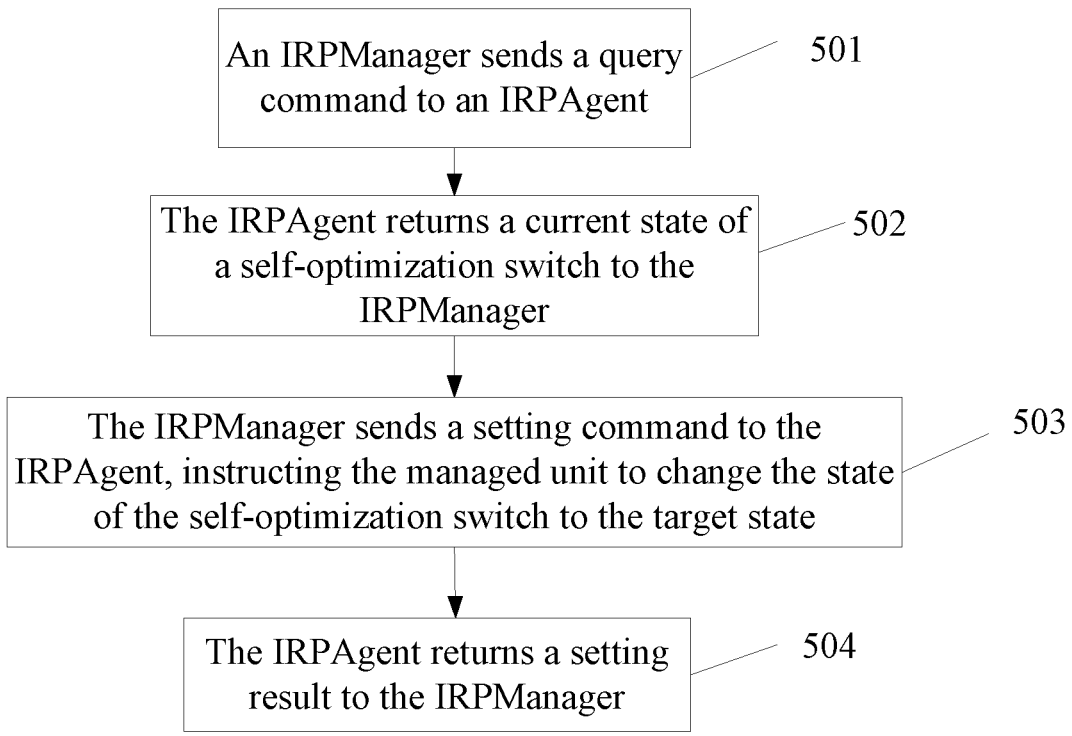
FIG. 5 is a flowchart of a method for controlling a self-optimization switch according to a third embodiment of the present disclosure.

This embodiment of the present disclosure provides a method for controlling a self-optimization switch. As shown in FIG. 5, the method includes:

501. An integration reference point manager sends a query command to an integration reference point agent.

A user sends a query command to the IRP Agent through the IRP Manager, where the query command is an instruction for obtaining a state of a self-optimization switch supported by a corresponding managed unit. For example, in a specific implementation process, a format of the query command may be: listSoFuncSwitch(ctrlObjInfomation,optimizationTypeList).

The input parameter ctrlObjInfomation represents a managed unit providing a self-optimization capability, and a value type may be a string or an enumeration type. A possible value is EM (Element Management System), NE instance (one or multiple network element instances), and NE TYPE (network element type). The optimizationTypeList is a list of optimization switch types that are owned by the managed unit. A type of each element in the list is optimizationType and indicates an optimization switch type owned by the managed unit.

Specifically, the optimizationType may be an enumeration type. For example, LB, ICIC, HO, RACH, CC, and ES may be used to represent load balancing self-optimization, inter-cell interference coordination self-optimization, handover self-optimization, RACH self-optimization, capacity and coverage self-optimization, and energy saving self-optimization respectively.

502. The integration reference point agent returns a current state of the self-optimization switch to the integration reference point manager.

After receiving a query command sent by the integration reference point manager, the integration reference point agent queries a switch state in a self-optimization field supported by the corresponding managed unit, and returns the queried current state of the self-optimization switch through a list of current state information of the self-optimization switch owned by the managed unit. For example, return the queried current state of the self-optimization switch to the integration reference point manager by outputting a selfOptFuncSwitchList parameter. The selfOptFuncSwitchList is the list of current state information of the self-optimization switch owned by the managed unit. Each element in the list is the managed unit, the self-optimization switch owned by the managed unit, and a corresponding list of current state values, for example, (ctrlObjInfomation, List<optimizationType,switch>). If the returned current state value of the switch is on (For description in an intuitive manner, on is used to replace True and off is used to replace False; the state value may also be directly represented by True and False. For example, True may be used to indicate that the switch is turned on, and False may be used to indicate that the switch is turned off. Certainly, True may also be used to indicate that the switch is turned off, and False may also be used to indicate that the switch is turned on), the state of the switch is on; if the returned current state value of the switch is off, the state of the switch is off.

The following describes several query cases by using some examples:

1. If the integration reference point manager wants to query a state of an ICIC self-optimization switch on the EM, the format of the query command is listSoFuncSwitch(EM, ICIC). If the returned query result is "EM,(ICIC,on)", the current state of the ICIC self-optimization switch on the EM is on.

2. If the integration reference point manager wants to query states of an LB self-optimization switch and the ICIC self-optimization switch on an entity network element eNodeB_A, the format of the query command is: listSoFuncSwitch(eNodeB_A,(LB,ICIC)). If the returned query result is "eNodeB_A,(LB, on;ICIC,off)", the current state of the LB self-optimization switch on the eNodeB_A is on and the current state of the ICIC self-optimization switch on the eNodeB_A is off.

3. If the integration reference point manager wants to query the states of the LB self-optimization switch and the ICIC self-optimization switch on more than two entity network elements, for example, eNodeB_A and eNodeB_B, the format of the query command is: listSoFuncSwitch((eNodeB_A,eNodeB_B),(LB,ICIC)). If the returned query result is "eNodeB_A, (LB,on,IC,off); eNodeB_B, (LB,on, ICIC,on)", the state of the LB self-optimization switch on the eNodeB_A is on, the state of the ICIC self-optimization switch on the eNodeB_A is off, and the states of both the LB self-optimization switch and the ICIC self-optimization switch on the eNodeB_B are on.

4. If the integration reference point manager wants to query the states of the LB self-optimization switch and the ICIC self-optimization switch on a type of network element (for example, an eNodeB type), the format of the query command is: listSoFuncSwitch(ENBFunction,(LB,ICIC)), and the returned result includes the states of the LB self-optimization switch and the ICIC self-optimization switch on all network elements of the eNodeB type. If the returned query result is "eNodeB_A, (LB,on;ICIC,off); eNodeB_B, (LB,on;ICIC,off)", the state of the LB self-optimization switch on the eNodeB_A is on, the state of the ICIC self-optimization switch on the eNodeB_A is off, the state of the LB self-optimization switch on the eNodeB_B is on, and the state of the ICIC self-optimization switch on the eNodeB_B is off.

503. The integration reference point manager sends a setting command to the integration reference point agent, instructing the managed unit to change the state of the self-optimization switch to the target state.

For example, in a specific implementation process, a format of the setting command sent by the integration reference point manager is: setSoFuncSwitch(ctrlObjInfomation,optimizationTypeSwitchList), where, the ctrlObjInfomation represents the managed unit providing the self-optimization capability, the optimizationTypeSwitchList is a specific list of switch parameters, for example, List of <optimizationType,switch>. For details about the parameters, see the description about the query command listSoFuncSwitch.

The following describes several setting cases by using some examples:

1. To set the state of the ICIC self-optimization switch on the EM to on, the integration reference point manager sends a setting command setSoFuncSwitch(EM,ICIC,off) to the IRP Agent.

2. To set the states of both the ICIC self-optimization switch and a CC self-optimization switch on the network element entity eNodeB_A to on, the integration reference point manager sends a setting command setSoFuncSwitch (eNodeB_A,(ICIC,on),(CC,on)) to the IRP Agent.

3. To set the states of both the LB self-optimization switch and the CC self-optimization switch on the network element entities eNodeB_A and eNodeB_B to off, the integration reference point manager sends a setting command setSoFuncSwitch((eNodeB_A,eNodeB_B),(LB,off),(CC,off)) to the IRP Agent.

4. To set the states of both an RACH self-optimization switch and an HO self-optimization switch on all the network elements of the ENBFunction type to on, the integration reference point manager sends a setting command setSoFuncSwitch(ENBFunction,(RACH,on),(HO,on)) to the IRP Agent.

504. The integration reference point agent returns a setting result to the integration reference point manager.

After receiving the setting command sent by the integration reference point manager, the integration reference point agent also needs to return the setting result to the integration reference point manager.

If the integration reference point agent successfully sets the state of the self-optimization switch to the target state, the integration reference point agent returns True to the integration reference point manager; if the integration reference point agent fails to set the state of the self-optimization switch to the target state, the integration reference point agent returns False to the integration reference point manager.

This embodiment of the present disclosure provides a method for controlling a self-optimization switch. By using the technical solution provided in this embodiment of the present disclosure, the state of the self-optimization switch can be known at any time and the state of the self-optimization switch can be controlled. Thereby, enabling or disabling of the self-optimization is controlled, which satisfies a self-optimization management requirement.

Embodiment 5

This embodiment of the present disclosure provides a method for controlling a self-optimization switch.

In this embodiment, the self-optimization switch is controlled by changing an NRM on an existing NRM IRP. In this embodiment of the present disclosure, a corresponding switch attribute is defined for each self-optimization field. A value of the switch is Boolean. When the switch attribute is True, the self-optimization switch is turned on; otherwise, the self-optimization switch is turned off.

Because entities that provide a self-optimization capability may be centralized on an EM, or distributed on each NE, or even concurrently distributed on the EM and an NE, a switch control attribute needs to be added to NRMs on an IRPAgent, the EM, and the NE respectively.

Table 2 is a list of IRPAgent attributes after the switch control attribute is added.

TABLE 2

| Attribute Name | Support Limitation | Read Limitation | Write Limitation |
| --- | --- | --- | --- |
| iRPAgentId | M | M | — |
| systemDN | C | M | — |
| selfOptHOFuncEnabled | CM | M | M |
| selfOptLBFuncEnabled | CM | M | M |
| selfOptICFuncEnabled | CM | M | M |
| selfOptCCFuncEnabled | CM | M | M |
| selfOptRACHFuncEnabled | CM | M | M |
| selfOptESFuncEnabled | CM | M | M |

In Table 2, attributes iRPAgentId and systemDN are existing attributes of an existing IRPAgent NRM, and attributes selfOptHOFuncEnabled, selfOptLBFuncEnabled, selfOptICFuncEnabled, selfOptCCFuncEnabled, selfOptRACHFuncEnabled, and selfOptESFuncEnabled are newly added attributes. M means mandatory, CM means mandatory under some conditions, and C means conditional. Taking the selfOptRACHFuncEnabled attribute as an example, the corresponding support limitation is CM, the corresponding read limitation is M, and the corresponding write limitation is M, indicating that the on/off state of the selfOptRACHFuncEnabled attribute may be queried and obtained when self-optimization is supported and that the on/off state of the selfOptRACHFuncEnabled attribute may also be set.

Table 3 is a list of ManagementNode NRM attributes of the EM after the switch control attribute is added.

TABLE 3

| Attribute Name | Support Limitation | Read Limitation | Write Limitation |
| --- | --- | --- | --- |
| managementNodeId | M | M | — |
| userLabel | M | M | M |
| vendorName | M | M | — |
| userDefinedState | M | M | M |
| locationName | M | M | — |
| swVersion | M | M | — |
| managedElements | M | M | — |
| selfOptHOFuncEnabled | CM | M | M |
| selfOptLBFuncEnabled | CM | M | M |
| selfOptICFuncEnabled | CM | M | M |
| selfOptCCFuncEnabled | CM | M | M |
| selfOptRACHFuncEnabled | CM | M | M |
| selfOptESFuncEnabled | CM | M | M |

In Table 3, attributes managementNodeId, userLabel, vendorName, userDefinedState, locationName, swVersion, and managedElements are existing attributes of an existing ManagementNode NRM, and attributes selfOptHOFuncEnabled, selfOptLBFuncEnabled, selfOptICFuncEnabled, selfOptCCFuncEnabled, selfOptRACHFuncEnabled, and selfOptESFuncEnabled are newly added attributes.

When the integration reference point agent is distributed on each NE, the switch control attribute needs to be added to the NRMs of each NE. For example, when the integration reference point agent is distributed on a network element which is an eNodeB type, the switch control attribute needs to be added to the NRM of the eNodeB. Table 4 is a list of ENBFunction NRM attributes of the eNB after the switch control attribute is added.

TABLE 4

| Attribute Name | Support Limitation | Read Limitation | Write Limitation |
|---|---|---|---|
| x2BlackList | CM | M | M |
| x2WhiteList | CM | M | M |
| x2HOBlackList | CM | M | M |
| selfOptHOFuncEnabled | CM | M | M |
| selfOptLBFuncEnabled | CM | M | M |
| selfOptICFuncEnabled | CM | M | M |
| selfOptCCFuncEnabled | CM | M | M |
| selfOptRACHFuncEnabled | CM | M | M |
| selfOptESFuncEnabled | CM | M | M |

In Table 4, attributes x2BlackList, x2WhiteList, and x2HOBlackList are existing attributes of an existing ENB-Function NRM, and attributes selfOptHOFuncEnabled, selfOptLBFuncEnabled, selfOptICFuncEnabled, selfOptCCFuncEnabled, selfOptRACHFuncEnabled, and selfOptESFuncEnabled are newly added attributes.

An existing Basic/Bulk CM IRP already defines how to query an NRM attribute and how to set the attribute. In this embodiment of the present disclosure, an existing Basic/Bulk CMIRP operation may be used to query and set the state of the self-optimization switch to control enabling or disabling of the self-optimization.

This embodiment of the present disclosure provides a method for controlling a self-optimization switch. By using the technical solution provided in this embodiment of the present disclosure, the state of the self-optimization switch can be controlled and known, and the enabling or disabling of the self-optimization can be controlled, which satisfies a self-optimization management requirement.

Embodiment 6

Figure 6:
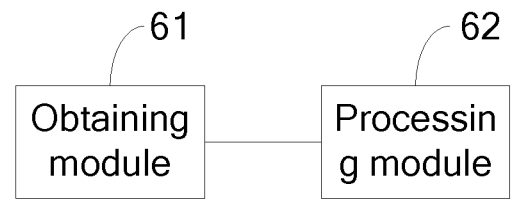
FIG. 6 is a block diagram of an apparatus for controlling a self-optimization switch according to a sixth embodiment of the present disclosure.

This embodiment of the present disclosure provides an apparatus for controlling a self-optimization switch. As shown in FIG. 6, the apparatus includes an obtaining module 61 and a processing module 62.

The obtaining module 61 is configured to obtain a target state of a self-optimization switch. The processing module 62 is configured to send a setting command that includes the target state to a managed unit, where the setting command instructs the managed unit to change a state of the self-optimization switch to the target state.

The obtaining module is further configured to obtain a current state of the self-optimization switch. In this case, the obtaining module includes a sending unit and a receiving unit.

The sending unit is configured to send a query command to the managed unit, where the query command is an instruction for obtaining the current state of the self-optimization switch. The receiving unit is configured to receive the current state of the self-optimization switch returned from the managed unit.

The receiving unit is further configured to receive a setting result returned from the managed unit.

Figure 7:
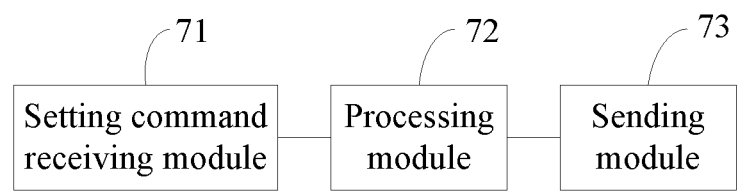
FIG. 7 is a block diagram of an apparatus for controlling a self-optimization switch according to the sixth embodiment of the present disclosure.

This embodiment of the present disclosure provides another apparatus for controlling a self-optimization switch. As shown in FIG. 7, the apparatus includes a setting command receiving module 71 and a processing module 72.

The setting command receiving module 71 is configured to receive a setting command that is sent by a managing unit and includes a target state of a self-optimization switch. The processing module 72 is configured to change a state of the self-optimization switch to the target state according to the setting command.

The apparatus further includes a sending module 73 configured to return a setting result to the managing unit.

The apparatus is further configured to report a current state of the self-optimization switch to the managing unit. The apparatus further includes a query command receiving module, a querying module, and a sending module.

The query command receiving module is configured to receive a query command sent by the managing unit. The querying module is configured to obtain the current state of the self-optimization switch according to the query command. The sending module is configured to return the current state of the self-optimization switch to the managing unit.

This embodiment of the present disclosure provides an apparatus for controlling a self-optimization switch. By using the technical solution provided in this embodiment of the present disclosure, the current state of the self-optimization switch can be known and the state of the self-optimization switch can be controlled, and thereby enabling or disabling of the self-optimization is controlled, which satisfies a self-optimization management requirement.

Embodiment 7

Figure 8:
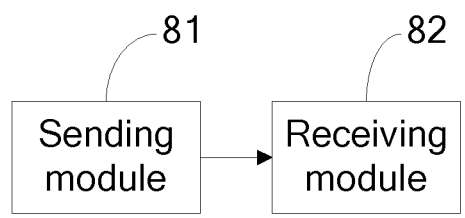
FIG. 8 is a block diagram of an apparatus for controlling a self-optimization switch according to a seventh embodiment of the present disclosure.

This embodiment of the present disclosure provides an apparatus for controlling a self-optimization switch. As shown in FIG. 8, the apparatus includes a sending module 81 and a receiving module 82.

The sending module 81 is configured to send a query command to a managed unit, where the query command is an instruction for obtaining a current state of the self-optimization switch. The receiving module 82 is configured to receive the current state of the self-optimization switch returned from the managed unit.

Figure 9:
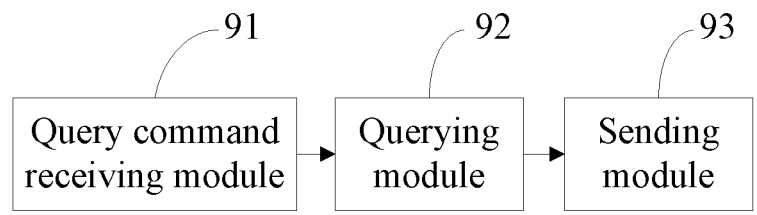
FIG. 9 is a block diagram of an apparatus for controlling a self-optimization switch according to the seventh embodiment of the present disclosure.

This embodiment of the present disclosure provides another apparatus for controlling a self-optimization switch. As shown in FIG. 9, the apparatus includes a query command receiving module 91, a querying module 92, and a processing module 93.

The query command receiving module 91 is configured to receive a query command sent by a managing unit. The querying module 92 is configured to obtain a current state of a self-optimization switch according to the query command. The sending module 93 is configured to return the current state of the self-optimization switch to the managing unit.

This embodiment of the present disclosure provides an apparatus for controlling a self-optimization switch. In this embodiment of the present disclosure, the current state of the self-optimization switch is obtained through a query command. By using the technical solution provided in this embodiment of the present disclosure, the current state of the self-optimization switch can be known at any time, which satisfies a self-optimization management requirement.

Embodiment 8

Figure 10:
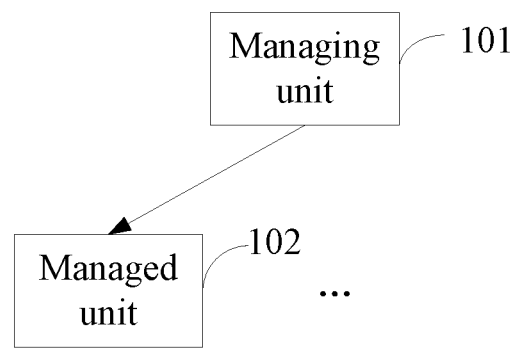
FIG. 10 is a block diagram of a system for controlling a self-optimization switch according to an eighth embodiment of the present disclosure.
Figure 11:
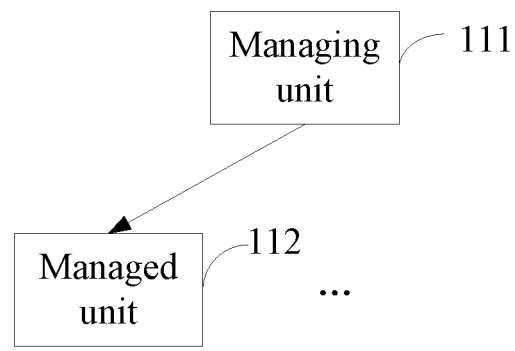
FIG. 11 is a block diagram of a system for controlling a self-optimization switch according to a ninth embodiment of the present disclosure.

This embodiment of the present disclosure provides a system for controlling a self-optimization switch. As shown in FIG. 10, the system includes a managing unit 101 and a managed unit 102.

The managing unit 101 is configured to obtain a target state of a self-optimization switch, and send a setting command that includes the target state to the managed unit. The managed unit 102 is configured to receive the setting command that is sent by the managing unit 101 and includes the target state of the self-optimization switch, and change a state of the self-optimization switch to the target state according to the setting command.

The managing unit is further configured to send a query command to the managed unit, where the query command is an instruction for obtaining a current state of the self-optimization switch, and receive the current state of the self-optimization switch returned from the managed unit. The managed unit is further configured to receive the query command sent by the managing unit, and return the current state of the self-optimization switch to the managing unit.

After the managing unit sends the setting command to the managed unit, the managing unit is further configured to receive a setting result returned from the managed unit. The managed unit is further configured to return the setting result to the managing unit.

One managing unit may correspond to more than two managed units.

This embodiment of the present disclosure provides a system for controlling a self-optimization switch. In this embodiment of the present disclosure, a user-desired target state of the self-optimization switch is known firstly, and then the state of the self-optimization switch is changed so that the state of the self-optimization switch is the same as the target state. By using the technical solution provided in this embodiment of the present disclosure, the state of the self-optimization switch can be controlled, and thereby enabling or disabling of the self-optimization is controlled, which satisfies a self-optimization management requirement.

Embodiment 9

This embodiment of the present disclosure provides a system for controlling a self-optimization switch. The system includes a managing unit 111 and a managed unit 112.

The managing unit 111 is configured to send a query command to the managed unit, where the query command is an instruction for obtaining a current state of a self-optimization switch, and receive the current state of the self-optimization switch returned from the managed unit. The managed unit 112 is configured to receive the query command sent by the managing unit, obtain the current state of the self-optimization switch according to the query command, and return the current state of the self-optimization switch to the managing unit.

One managing unit may correspond to more than two managed units.

This embodiment of the present disclosure provides a system for controlling a self-optimization switch. In this embodiment of the present disclosure, the current state of the self-optimization switch is obtained through a query command. By using the technical solution provided in this embodiment of the present disclosure, the current state of the self-optimization switch can be known at any time, which satisfies a self-optimization management requirement.

Based on descriptions of the preceding embodiments, it is understandable to those skilled in the art that the present disclosure may be implemented by software in addition to a necessary universal hardware platform or by hardware only. In most circumstances, the former is preferred. Based on such understanding, the essence of the technical solutions of the present disclosure or contributions to the prior art may be embodied by a software product. The computer software product is stored in a readable storage medium, for example, a floppy disk, a hard disk, or a Compact Disk-Read Only Memory (CD-ROM) on a computer, and incorporates several instructions to instruct a computer device, for example, a personal computer, a server, or a network device, to execute the method provided by each embodiment of the present disclosure.

The preceding descriptions are merely exemplary embodiments of the present disclosure, but not intended to limit the protection scope of the present disclosure. Any modification or substitution readily conceivable to those skilled in the art within the scope of the technology disclosed by the present disclosure shall fall within the protection scope of the present disclosure. Therefore, the protection scope of the present disclosure is subject to the appended claims.

What is claimed is:

1. A method for controlling a switch, the method comprising:
    obtaining, by an integration reference point agent (IRPAgent) from an integration reference point manager (IRPManager), a target state of a first self-optimization function, wherein an attribute list is set on the IRPAgent, and the attribute list comprises switch attributes defined for self-optimization functions, and the self-optimization functions comprise handover, load balancing, interference control, capacity and coverage, random access channel optimization, and energy saving; and
    setting, by the IRPAgent, a state of a switch attribute defined for the first self-optimization function in the attribute list to the target state to control enabling or disabling of the first self-optimization function,
    wherein, for each switch attribute in the attribute list, the state of the switch attribute has a Boolean value, wherein the Boolean value is on for enabling the self-optimization function corresponding to the switch attribute, and the Boolean value is off for disabling the self-optimization function corresponding to the switch attribute, and
    wherein in response to determining that the state of the switch attribute defined for the first self-optimization function is on, the first self-optimization function is enabled, and in response to determining that the state of the switch attribute defined for the first self-optimization function is off, the first self-optimization function is disabled.

2. The method according to claim 1, wherein the switch attributes defined for self-optimization functions comprise: selfOptHOFuncEnabled, selfOptLBFuncEnabled, selfOptICFuncEnabled, selfOptCCFuncEnabled, selfOptRACHFuncEnabled, and selfOptESFuncEnabled.

3. The method according to claim 1, further comprising: sending, by the IRPAgent, a setting result to the IRPManager.

4. The method according to claim 1, further comprising:
    receiving, by the IRPAgent, a query command from the IRPManager that is used for querying the state of the switch attribute defined for the first self-optimization function; and
    obtaining, by the IRPAgent, the state of the switch attribute defined for the first self-optimization function; and
    returning, by the IRPAgent, the state of the switch attribute defined for the first self-optimization function to the IRPManager.

5. The method according to claim 1, wherein a read limitation corresponding to each switch attribute indicates, for each switch attribute, whether a state of the switch attribute can be queried, and a write limitation corresponding to each switch attribute is M, which indicates, for each switch attribute, whether a state of the switch attribute can be set.

6. A system, comprising:
a first device configured as an integration reference point manager (IRPManager); and
a second device configured as an integration reference point agent (IRPAgent),
wherein an attribute list is set on the IRPAgent, and the attribute list comprises switch attributes defined for self-optimization functions, and the self-optimization functions comprise handover, load balancing, interference control, capacity and coverage, random access channel optimization, and energy saving, wherein the IRPAgent is configured to:
obtain, from the IRPManager, a target state of a first self-optimization function; and
set a state of a switch attribute defined for the first self-optimization function in the attribute list to the target state to control enabling or disabling of the first self-optimization function,
wherein, for each switch attribute in the attribute list, the state of the switch attribute has a Boolean value, wherein the Boolean value is on for enabling the self-optimization function corresponding to the switch attribute, and the Boolean value is off for disabling the self-optimization function corresponding to the switch attribute, and
wherein in response to determining that the state of the switch attribute defined for the first self-optimization function is on, the first self-optimization function is enabled, and in response to determining that the state of the switch attribute defined for the first self-optimization function is off, the first self-optimization function is disabled.

7. The system according to claim 6, wherein the switch attributes defined for self-optimization functions comprise: selfOptHOFuncEnabled, selfOptLBFuncEnabled, selfOptICFuncEnabled, selfOptCCFuncEnabled, selfOptRACHFuncEnabled, and selfOptESFuncEnabled.

8. The system according to claim 6, wherein a read limitation corresponding to each switch attribute indicates, for each switch attribute, whether a state of the switch attribute can be queried, and a write limitation corresponding to each switch attribute indicates, for each switch attribute, whether a state of the switch attribute can be set.

9. A device, comprising:
a non-transitory computer readable storage medium, wherein the non-transitory computer readable storage medium stores an attribute list, and the attribute list comprises switch attributes defined for self-optimization functions, and the self-optimization functions comprise handover, load balancing, interference control, capacity and coverage, random access channel optimization, and energy saving; and
a processor configured to:
obtain, from a integration reference point manager (IRPManager), a target state of a first self-optimization function; and
set a state of a switch attribute defined for the first self-optimization function in the attribute list to the target state to control enabling or disabling of the first self-optimization function,
wherein, for each switch attribute in the attribute list, the state of the switch attribute has a Boolean value, wherein the Boolean value is on for enabling the self-optimization function corresponding to the switch attribute, and the Boolean value is off for disabling the self-optimization function corresponding to the switch attribute, and
wherein in response to determining that the state of the switch attribute defined for the first self-optimization function is on, the first self-optimization function is enabled, and in response to determining that the state of the switch attribute defined for the first self-optimization function is off, the first self-optimization function is disabled.

10. The device according to claim 9, wherein the switch attributes defined for self-optimization functions comprise: selfOptHOFuncEnabled, selfOptLBFuncEnabled, selfOptICFuncEnabled, selfOptCCFuncEnabled, selfOptRACHFuncEnabled, and selfOptESFuncEnabled.

11. The device according to claim 9, when the processor is further configured to:
send a setting result to the IRPManager.

12. The device according to claim 9, wherein the processor is further configured to:
receive a query command from the IRPManager that is used for querying the state of the switch attribute defined for the first self-optimization function; and
obtain the state of the switch attribute defined for the first self-optimization function; and
return the state of the switch attribute defined for the first self-optimization function to the IRPManager.

13. The device according to claim 9, wherein a read limitation corresponding to each switch attribute indicates, for each switch attribute, whether a state of the switch attribute can be queried, and a write limitation corresponding to each switch attribute that indicates, for each switch attribute, whether a state of the switch attribute can be set.

14. A non-transitory computer readable medium comprising a program and an attribute list, wherein the attribute list comprises switch attributes defined for self-optimization functions, and the self-optimization functions comprise handover, load balancing, interference control, capacity and coverage, random access channel optimization, and energy saving, and when the program is executed by a processor, the following steps are performed:
obtaining, from a integration reference point manager (IRPManager), a target state of a first self-optimization function; and
setting a state of a switch attribute defined for the first self-optimization function in the attribute list to the target state to control enabling or disabling of the first self-optimization function,
wherein, for each switch attribute in the attribute list, the state of the switch attribute has a Boolean value, wherein the Boolean value is on for enabling the self-optimization function corresponding to the switch attribute, and the Boolean value is off for disabling the self-optimization function corresponding to the switch attribute, and
wherein in response to determining that the state of the switch attribute defined for the first self-optimization function is on, the first self-optimization function is enabled, and in response to determining that the state of the switch attribute defined for the first self-optimization function is off, the first self-optimization function is disabled.

15. The non-transitory computer readable medium according to claim 14, wherein the switch attributes defined for self-optimization functions comprise: selfOptHOFuncEnabled, selfOptLBFuncEnabled, selfOptICFuncEnabled, selfOptCCFuncEnabled, selfOptRACHFuncEnabled, and selfOptESFuncEnabled.

16. The non-transitory computer readable medium according to claim 14, wherein a read limitation corresponding to each switch attribute indicates, for each switch attribute, whether a state of the switch attribute can be queried, and a write limitation corresponding to each switch attribute that indicates, for each switch attribute, whether a state of the switch attribute can be set.

* * * * *